(No Model.)
J. A. KERNOCHAN.
Screw and Bolt Lock.
No. 231,588. Patented Aug. 24, 1880.
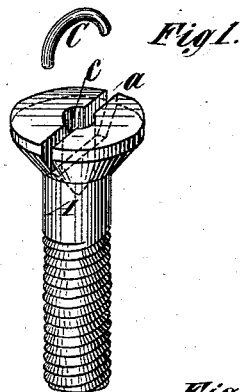
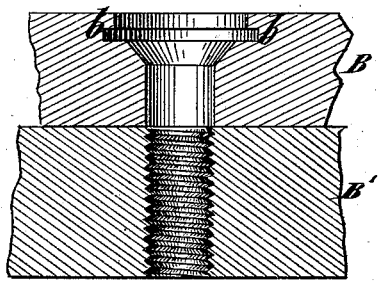
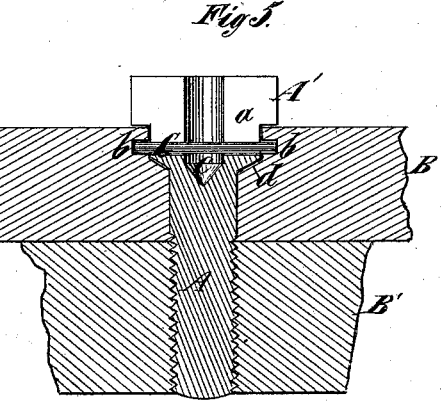
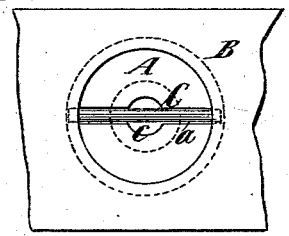
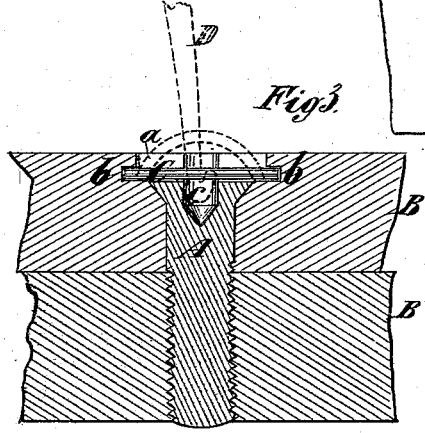
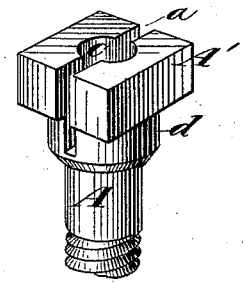

UNITED STATES PATENT OFFICE.

JOHN A. KERNOCHAN, OF PITTSFIELD, MASSACHUSETTS.

SCREW AND BOLT LOCK.

SPECIFICATION forming part of Letters Patent No. 231,588, dated August 24, 1880.

Application filed March 30, 1880. (No model.)

*To all whom it may concern:*

Be it known that I, JOHN A. KERNOCHAN, of Pittsfield, in the county of Berkshire and State of Massachusetts, have invented certain new and useful Improvements in Screw and Bolt Locks, of which the following is a specification.

The object of my invention is to provide a means whereby screws and bolts which are used without nuts, such as tap-bolts, may be locked to the parts or articles through which they project, so as to prevent their unscrewing. The invention may, however, be applied to bolts which are furnished with nuts.

To this end my invention consists in the combination, with a screw or bolt having a nicked head, of a locking wire or bar which is of a thickness to be received within the said nick, and which, when bent or curved, is short enough to be received within the nick in the screw or bolt, but which, on being straightened, or partly straightened, is of a length to project beyond the nick in the screw or bolt and engage with the article or part through which the screw or bolt projects.

Where the screw or bolt is to be used for securing parts or articles of metal the hole or socket through which it passes is provided with an annular circumferential groove, or is internally enlarged or recessed below or within the mouth, so as to receive the ends of the locking piece or bar when straightened or partly straightened; but where the screw or bolt passes through wood or other material which is comparatively soft the ends of the locking piece or bar will penetrate into the wood or other material sufficiently to hold the screw or bolt against turning.

The wire or bar is always of a thickness to be received within the nick in the screw-head and revolves with the screw.

The screw or bolt may, if desirable, be provided with a cavity or recess extending beyond or below the nick to permit a hook to be inserted below the locking piece or bar to bend the latter and draw it out of the nick, so as to unlock the screw or bolt.

In the accompanying drawings, Figure 1 represents a perspective view of a screw and a detached view of a locking piece or bar to be applied thereto. Fig. 2 represents a sectional view of two pieces or parts to be secured by the screw. Fig. 3 represents a similar view to Fig. 4, showing the manner of inserting a hook to draw out the locking piece or bar. Fig. 4 represents a plan of the screw and a portion of the part through which it passes. Fig. 5 is a sectional view of two pieces or parts secured together by a tap-bolt having my invention applied to it, and Fig. 6 represents a perspective view of such tap-bolt.

Similar letters of reference designate corresponding parts in all the figures.

A designates a metal screw, such as is commonly used for securing together different articles, and B B' designate the parts or portions through which the screw passes, and which it secures together, it being screwed into the part B'. The parts or portions B B' may be flanges or pieces constituting parts of a machine or any other articles of wood, metal, or other material. The screw A has in its head or upper end a nick, *a*, which may, indeed, be the nick into which a screw-driver is inserted for turning the screw, but which is preferably slightly deeper than the nicks in ordinary screws.

C designates a locking piece or bar of a thickness to fit loosely in the nick *a*, and of a length, when curved as represented in Fig. 1, to fit within the nick *a* and have its ends covered and concealed by the nick.

After the screw has been screwed home, so that the nick *a* is below the surface of the part B, the locking piece or bar C is inserted and straightened, or partly straightened, so that its ends project slightly beyond the nick, as clearly shown in Figs. 2 and 3. When the part B is of wood or other material comparatively soft or yielding the ends of the locking piece or bar C will penetrate or indent themselves sufficiently into the part B to hold the screw against turning, and if desirable the ends of the locking piece or bar might be pointed or sharpened, so as to penetrate the wood easily. When the part B is of metal or other material so hard that the ends of the locking piece or bar could not penetrate it the socket which receives the screw should be provided with a circumferential groove, *b*, or should be widened or enlarged below or within the mouth of the socket, as clearly shown in Figs. 2 and 3, into which the ends of the locking piece or bar C may project. While the screw in this case might be turned a small fraction of a single turn it could not be unscrewed to any extent, as the outward movement of the screw would press the locking piece or bar upward against the side of the groove or recess $b$ and prevent further unscrewing.

The locking piece or bar C may be made of some material, such as iron, so that it will retain its curved shape, as shown clearly in Fig. 1, to be straightened by a blow; or it may be made of steel and tempered, so that its normal state is straight, and be bent to permit of its insertion in the nick $a$.

In order to provide for the ready unlocking of the screw to permit it to be withdrawn, I may furnish the screw with a cavity, $c$, extending below or beyond the nick $a$. This construction permits of a hook, D, being readily inserted below the locking piece or bar, as clearly shown in Fig. 3, so as to engage with said piece or bar and withdraw it.

The bolt shown in Figs. 5 and 6 differs from the screw already described in that it has a head, A', which has a nick, $a$, and a cavity, $b$, like the screw A. The bolt is provided with a cylindrical portion, $d$, below the head, which is larger than the body or threaded portion of the bolt; but this is not essential.

The groove or recess $b$ in the part B and the locking piece or bar C are like those previously described, and the method of locking the bolt precisely the same.

By my invention I provide in a simple and inexpensive manner for locking screws or bolts which are not provided with nuts—such as tap-bolts—to the parts through which they pass, and while the invention is useful for various purposes, it is particularly adapted for railway purposes, such as for fish-plates and the like; also, for bolting together railway-structures.

What I claim as my invention, and desire to secure by Letters Patent, is—

1. The combination, with a screw or bolt having a nicked head, of a locking wire or bar of a thickness to be received within the said nick, and which when bent or curved is short enough to be received and concealed within the nick, but which when straightened or partly straightened, is of a length to project beyond the nick, substantially as and for the purpose specified.

2. The combination of a screw or bolt having a nicked head, a plate or piece provided with a hole or socket for said screw or bolt, and having such hole or socket circumferentially grooved or enlarged below or within its mouth, and a locking piece or bar inserted into the nick of the screw or bolt, capable of revolving with it and of projecting from said nick into said circumferential groove or enlargement, substantially as specified.

3. The combination of the nicked screw or bolt A, having a cavity, $c$, below the nick, the plate B, having the groove or recess $b$, and the locking piece or bar C, all substantially as specified, and to be applied in the manner set forth.

JOHN A. KERNOCHAN.

Witnesses:
FREDK. HAYNES,
A. C. WEBB.